United States Patent Office 2,797,775
Patented July 2, 1957

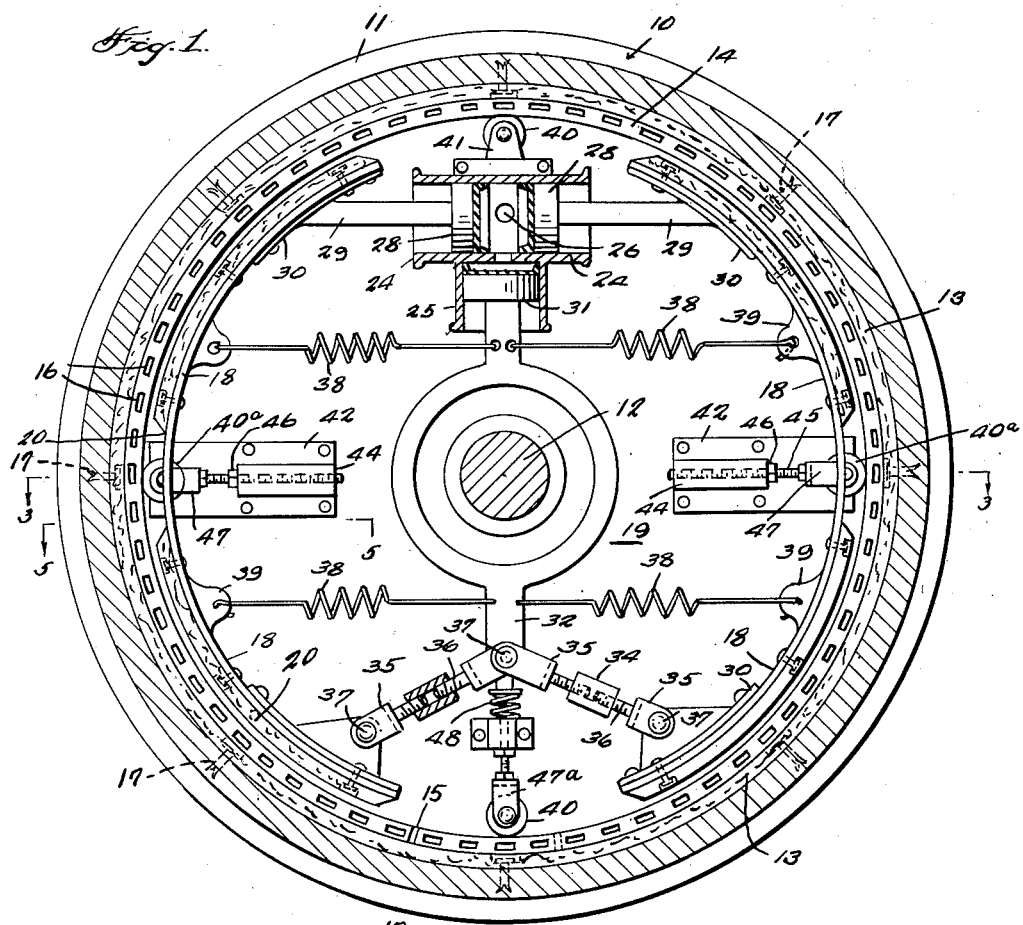

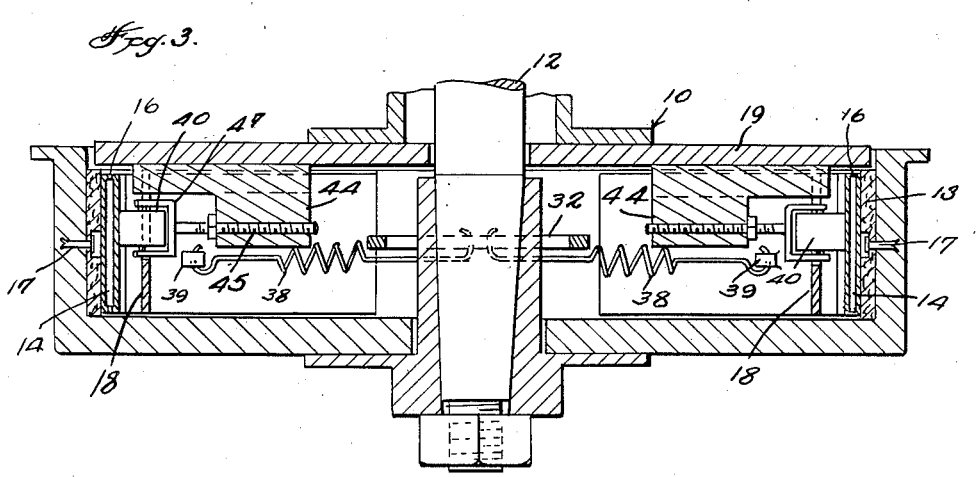
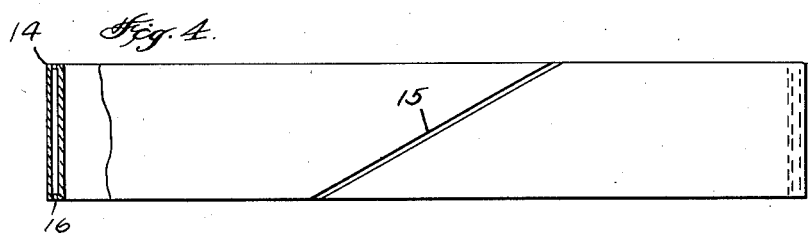
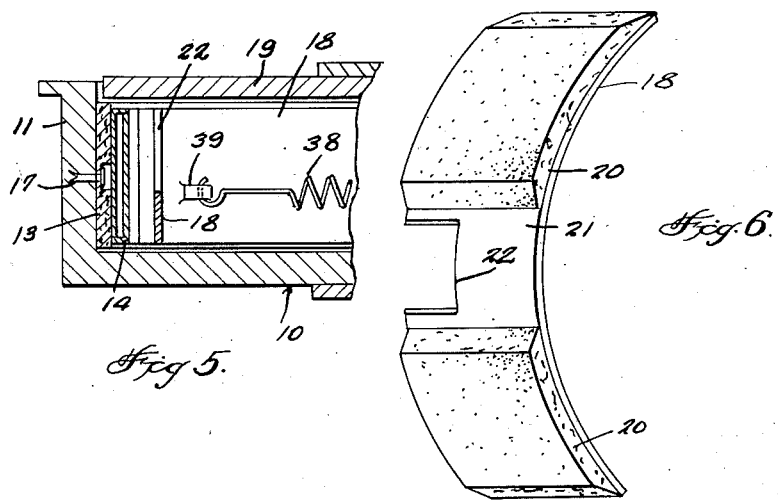

2,797,775

HYDRAULIC BRAKE WITH FLOATING LINING

Paul B. Burhans, Miami, Fla.

Application May 11, 1954, Serial No. 429,013

1 Claim. (Cl. 188—78)

This invention relates to a floating hollow brake shoe and an inner brake shoe and lining engageable therewith.

It is an object of this invention to provide a floating hollow brake shoe for engagement with an inner brake shoe and lining, which are actuated into braking engagement with the brake drum lining.

It is a principal object of this invention to provide an inner brake and lining and a hollow brake shoe of the kind to be more particularly described hereinafter such as to provide for a greater braking capacity than is customary in the usual wheels of an automobile, truck, trailer or the like having a brake wheel, to keep pace with greater speeds and more powerful engines.

It is another object of this invention to provide a floating hollow ventilated brake shoe mechanism which is simple and cheap to manufacture and which will know no "brake fade" and can withstand the greater heat produced by frictional force.

It is yet a further object of this invention to provide an improved floating shoe of this kind which will be particularly responsive to cooling before, during and after use.

Other and further objects and advantages of the invention will be hereinafter described and the novel features thereof defined in the appended claim.

In the drawings:

Fig. 1 is a plan view of a wheel having my floatng brake shoe and inner brake shoe and lining constructed according to my invention and taken on the line 1—1 of Fig. 2.

Fig. 2 is an elevation, partly in section.

Fig. 3 is a transverse section of the wheel taken on the line 3—3 of Fig. 1.

Fig. 4 is a side elevation, partly in section, of the floating brake shoe.

Fig. 5 is a fragmentary enlarged detailed section taken on the line 5—5 of Fig. 1.

Fig. 6 is an isometric view of the inner shoe removed from the brake assembly.

Referring to the drawings the numeral 10 designates generally a wheel having inner and outer brake shoes constructed according to my invention. The wheel 10 includes a drum 11 which is rotatable with a wheel axle or spindle 12 there being a floating hollow brake shoe 14 disposed within the confines of the wheel and engaging the inner surface of the outer lining 13 of the drum.

The floating hollow brake shoe 14 is formed of two sheets of thick spring steel, preferably about 3/16 inch thick and with a space between of about 3/16 inch clearance. On their edges, as seen in Figs. 1 and 3, are metal spaced connections between which appear openings 16. These connections could be balls or other small metal pieces welded in position. This spacing between the two sheets and openings 16 are necessary for ventilation to dissipate the heat generated by friction in operation of the brake. The brake is discontinuous at 15, so as to permit expansion against drum lining 13, when the inner brake shoes 18 are forced outwardly in braking. The outer brake lining 13 is secured in its proper position within the drum 11 by rivets 17 or other suitable fastening devices which fasten the lining to the drum 11. With this sort of structure the inner floating shoe may be readily inserted into the drum or removed therefrom without unduly disturbing the actual structure of the wheel 10 separate from the brakes.

A plurality of power brake shoes 18 with linings are disposed within the wheel 10 and are adapted to bear against the hollow shoe when the brake is applied to stop the rotation of the wheel.

A disc brake diaphragm or support 19 is located adjacent to one end and one side of the drum 11 for supporting the shoes 18.

The brake shoes 18 are each provided with a pair of spaced apart fixed brake linings 20, of the conventional type of brake lining material, which are slightly spaced apart intermediate the length thereof to provide a space 21 to accommodate radical movement on bracket 42. The shoes 18 have a cut-out 22 intermediate the length thereof in registration with the space 21 to provide for the rollers 40 to engage with the hollow shoe 14.

In the preferred form of this invention two inner brake shoes are provided and the brake shoes are hydraulically operated by a pair of end to end cylinders 24 which are secured on the disc support 19 and a third cylinder 25 which may be formed integral with the end to end cylinders 24, one end of the third cylinder 25 being in direct communication with both of the end to end cylinders 24 at the juncture of the open end thereof. An opening 26 is disposed at the juncture of the cylinders within which opening fluid pressure is adapted to be transmitted through a pressure line 27 for the actuation of the brakes. Pistons 28 are slidable in each of the cylinders 24 by the fluid pressure admitted therein.

Piston rods 29 are secured at one end to each of the pistons 28 and the other end of the piston rods 29 are fixedly secured to brackets 30 at one end of each of the brake shoes 18 as clearly shown in the drawings.

A piston 31 is slidable within the third cylinder 25, having a piston rod 32 fixed to the piston 31 and extending radially of the supporting disc 19. The piston rod 32, intermediate the length thereof is provided with an annular portion which is spaced about the axis or spindle 12 and the end of the piston rod 32 remote from its respective piston 31 is hingedly connected to the other end of the brake shoes.

A pair of outwardly extending turn buckles 34 are connected to the end of the piston rod 32 adjacent this other end of the inner brake shoes. The turn buckle 34 has a yoke 35 at each end thereof. A pivot 37 engages through each of the yokes and also through a piston rod 32 and the respective other ends of the brake shoes.

A coil spring 38 is fixedly connected between the ear 39 fixed on to the inner side of the inner brake shoes and the piston rod 32 for urging the shoes inwardly out of bearing contact with the floating hollow shoe.

In order to provide for the free floating engagement of the outer hollow brake shoe 14 within the drum 11, brake shoe pilot rollers 40 are adapted to bear against the shoe 14 and constantly urge it to its proper position within the wheel.

One of the rollers 40 is supported between a pair of supporting arms 41 outwardly of cylinders 24.

A pair of rollers 40$^a$ are disposed on the opposite sides of the supporting disc 19 and engage through the cut out 22 of each shoe 18 and bear against the inner side of the hollow shoe 14. These two rollers 40 and 40$^a$ are each radially adjustably connected to the disc 19 through a bracket 42. A screw 45 is threadably engaged in each of the sleeves 44 and is held in its selected position by a nut 46, there being a yoke 47 fixed on the screw 45 and engageable with a roller 40$^a$. The roller 40 is urged inwardly thereof in its engagement between one end of each of the brake shoes by a coil spring 48 so that the rollers may be all adequately adjusted for properly positioning the lining relative to the drum.

In the use and operation of the brake drum lining and brake described above, when the brakes are applied fluid pressure is communicated to cylinders 24 and 25 engaged through the opening 26 for urging the pistons 28 and 31 outwardly so that both of the brake shoes brakingly engage the inner surface of the floating hollow tubular brake lining. The brakes will engage the lining both at the upper end of each of the brake shoes and at the lower ends thereof. When the brakes are released from the brake lining the coil springs 38 will urge the brake shoes inwardly out of braking engagement with the brake lining but at all times the rollers 40 and 40$^a$ will remain in position for accurately locating the floating lining in its proper relation to the drum. The spring 48 will assure the continual engagement of the roller 40 carried by yoke 47$^a$ with the lining 14 and the rollers may be adequately adjusted by the adjustment of the nut 46 on screws 45. The rollers 40—40$^a$ properly position the floating lining 14 within the wheel 11 even when the brake shoes are released and in such released condition of the brake shoes the floating lining 14 may be removed for the insertion of a replacement floating lining.

When the brakes are applied the entire surface of the floating lining engages with each fixed outer lining 13.

The floating lining 14 is provided in order to that there will be two frictional braking surfaces within the brake drum. One of these surfaces is the outer surface of lining or brake shoe 14 and the other is the inner surface of this shoe. The outer surface of shoe 14 engages lining 13 which is a continuous lining, whereas the inner surface of the brake shoe 14 is engaged by the brake linings 20 carried by the shoes 18. The openings 16 between the inner and outer surfaces of shoe 14 are provided in order to effect a cooling of the brake shoe when under frictional pressure by engagement of the brake shoes 18 with the brake shoe 14.

While the specific details of one embodiment of this invention have been herein shown and described, the invention is not confined thereto as changes and alterations may be made without departing from the spirit and scope thereof as defined in the appended claim.

I claim:

A hydraulic brake of the kind described comprising a brake drum, an annular hollow floating brake shoe in said drum, a support disc adjacent an end of said drum, a pair of radially movable segmental brake shoes interiorly of said annular shoe and engagable therewith, a pair of cylinders in communicating end to end relation to each other secured to said disc, another cylinder connected to said pair of cylinders at the juncture thereof, a piston slidable in each of said cylinders, each of said pistons in said pair of cylinders being connected to one end of said shoes, said piston in said other cylinder being pivotally connected to the other end of said shoes, and rollers carried by said disc engagable with said lining.

References Cited in the file of this patent

UNITED STATES PATENTS

| | | |
|---|---|---|
| 1,272,690 | Madsen | July 16, 1918 |
| 1,616,659 | Heany | Feb. 8, 1927 |
| 1,644,635 | Christensen | Oct. 4, 1927 |
| 1,780,200 | Linderman | Nov. 4, 1930 |
| 2,087,383 | Lafitte | July 20, 1937 |
| 2,268,516 | Sacher | Dec. 30, 1941 |
| 2,605,864 | Burhans | Aug. 5, 1952 |